No. 621,486. Patented Mar. 21, 1899.
C. L. BURDICK.
PRESSURE GAGE.
(Application filed Feb. 23, 1898.)
(No Model.)
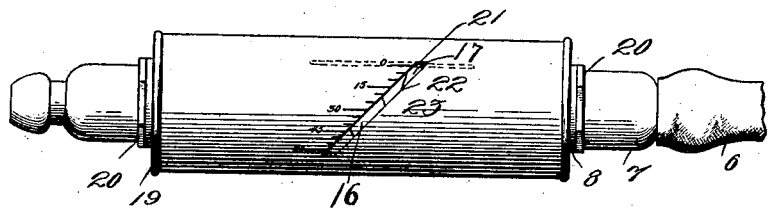
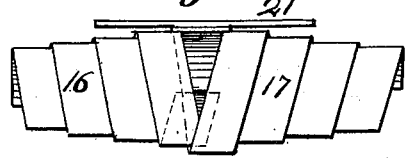
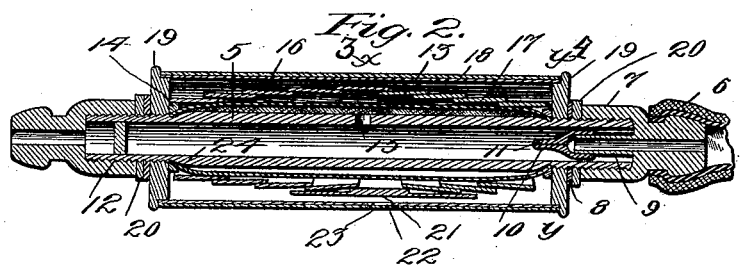
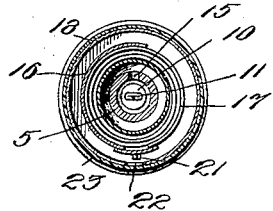 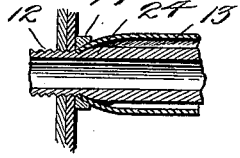 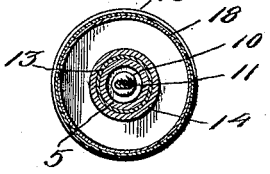
Witnesses
F. J. Koerth
H. O. Nash
Inventor
Charles L. Burdick,
by W. L. Stivens
Attorney

UNITED STATES PATENT OFFICE.

CHARLES L. BURDICK, OF LONDON, ENGLAND.

PRESSURE-GAGE.

SPECIFICATION forming part of Letters Patent No. 621,486, dated March 21, 1899.

Application filed February 23, 1898. Serial No. 671,350. (No model.)

*To all whom it may concern:*

Be it known that I, CHARLES L. BURDICK, a citizen of the United States, residing at London, in the county of Middlesex, England, have invented a new and useful Improvement in Pressure-Gages; and I do hereby declare the following to be a full, clear, and exact description of the same, reference being had to the accompanying drawings, in which—

Figure 1 is a side elevation of a pressure-gage according to my invention. Fig. 2 represents the same in central longitudinal section. Fig. 3 is a transverse section at the line X of Fig. 2. Fig. 4 is a transverse section at the line Y of Fig. 2. Fig. 5 shows in detail the preferred form of securing device for the elastic tube. Fig. 6 is a side view of the springs and index-arm.

This invention relates to that class of devices whereby the pressure of fluids is measured; and its object is to provide simple and effective means for accurately indicating to the eye of the operator the pressure of the fluid contents of any receptacle, and more particularly for indicating the pressure of air in pneumatic tires for wheels while in the act of filling the tire.

To this end my invention consists in the construction and combination of parts forming a pressure-gage, hereinafter more fully described, and particularly pointed out in the claims.

In the drawings, 5 represents a tubular body adapted at both ends to be connected with other tubes.

6 represents a flexible pipe or other inlet-tube, and 7 a coupling for the same, screw-threaded upon the body 5 and provided with suitable packing 8 to insure an air-tight joint. This coupling 7 I provide with a nozzle 9, which extends into the body 5 and is tipped with a nipple 10 of cushion-like elastic material—such, for example, as soft rubber—which is of a size at one end to spring closely upon the nozzle and which is normally closed at the other end, but is slit with a sharp knife to form a delivery 11 through the thick end, which will be forced open by internal pressure and permit air to be introduced into the body 5, but will be forced together or closed by pressure external to the nipple, thus serving as a check-valve against leakage backward from the body 5. The opposite end 12 of the body may be adapted to screw into bicycle-tire valves or to join with any other pipe or opening.

13 represents a tube of elastic material, such as rubber, surrounding the body 5 and secured at its ends thereon air-tight by any suitable band or wrapping 14.

15 is a port in the body 5, communicating between the interior chamber thereof and the interior of the tube 13.

16 and 17 represent spiral springs of ribbon-like form, secured at their interior ends upon the bands 14 and gradually approaching longitudinally toward each other. As they wind outward around the tube or expansion-chamber 13 they meet and one overlaps the other longitudinally midway of the said tube.

18 represents a cylindrical casing surrounding the springs 16 17 at a little distance therefrom and secured in position by means of head-pieces or disks 19, which are mounted on the body 5 and there secured by means of screw-nuts 20, which firmly press the disks against the ends of the casing. The free end of one or both springs 16 and 17 is provided with an indicator-arm 21, extending along the cylinder, but traveling with the spring circumferentially as the spring rotates by expansion and contraction. The spring and the indicator-arm do not move spirally while rotating in service; but every point on either the spring or arm moves in a plane which is at right angles with the axis of revolution. The said indicator-arm 21 has no movement parallel with the scale or its slot, but advances like a bar, always at the same angle therewith, and any point upon the bar would repeatedly cross the scale at the same point, so that the scale would serve the same purpose if marked along the bar or indicator-arm to be read relatively to the edge of the slot only that there would not be so much room for marking the numbers. Opposite to this indicator-arm is an aperture or window 22 through the shell 18. This window extends circumferentially a distance about equal to the arc of motion of the free ends of the springs, and it preferably extends longitudinally also, making it a spiral opening through the casing in order that more space may be furnished along its edges for scale-markings and index-numbers, so that every minute movement of the index-arm may be noted and great accuracy of reading the gage be attained. It is to correspond with the length of the window that the arm 21 is extended along the cylinder. An outer casing 23, of transparent material, may cover the window-opening to keep out dust and yet admit of reading the scale, and for the sake of finish this outer casing may extend over the whole cylinder portion of the device. This outer casing may be opaque and fitted to slide lengthwise over the window, leaving it open when in service.

In the preferred form illustrated in Fig. 5 the body 5 has a tapering shoulder at 24, upon which the elastic tube 13 is wedged by the surrounding ferrule 14, which is internally tapering and is crowded longitudinally upon the tube by the disk 19 and the nut 20, screw-threaded upon the body 5.

The operation is as follows: Having attached the end 12 to the receptacle in which the pressure is to be measured, the contents will flow through the aperture 15 into the tube 13 and expand it against the pressure of the enveloping springs 16 17, forcing them outward, whereby their circumference is increased and their free ends, with the arm 21 attached, are moved circumferentially, and the position of the arm at any time relatively to the gage-scale indicates the pressure in pounds per square inch or any other unit of measurement desirable to which the scale is graded. If it were to be used to indicate the pressure attained in pumping up a pneumatic tire, this device would be introduced as a connection somewhere in the tube through which the air is to be pumped, preferably with the end 12 screwed into the tire-valve and the end 7 connected with the pump delivery-pipe. Then the pressure in the tire, in the pump, and in this pressure-gage would at all times be alike, and that pressure would be indicated on the scale. The indicator-springs enveloping the pressure-tube insure direct and positive action. The spiral scale, with a correspondingly long yet circumferentially-traveling index-arm, gives greater space for gradations and numbers on the scale than if the scale were at right-angles to the path of the index-arm and insures greater accuracy of reading. The tapering shoulder inside of the flexible tube and the tapering ferrule outside and means for pressing the ferrule longitudinally over the tube upon the shoulder is a simple, easily-adjusted, and effective device for securing a separable airtight joint capable of resisting heavy pressures in service.

Having thus fully described my invention, what I believe to be new, and desire to secure by Letters Patent, is the following:

1. A tubular pressure-gage body having means for connecting its ends with other tubes or receptacles; a flexible tube surrounding the said body and secured tightly at its ends thereto; an aperture in the said body connecting the two tubes; a spiral spring or springs surrounding the flexible tube and having one end free and the other end secured to the body; a shell supported on the body and surrounding the said spring or springs and having a spiral window in it with scale-markings beside the window; and an index-arm upon the spring crossing the window to register with the said scale; substantially as described.

2. In pressure-gages, a circumferentially-expansible chamber; a spring wound in a conical spiral around the chamber to be unwound by the expansion of the chamber and an index for indicating the amount of pressure causing the expansion, substantially as described.

3. In a pressure-gage, a circumferentially-expansible chamber; two springs wound in conical spirals around the chamber with their outer ends meeting midway the length of the chamber and one spring overlapping the other, and an indicator-arm secured upon the overlapping end, substantially as described.

In testimony whereof I affix my signature in presence of two witnesses.

CHARLES L. BURDICK.

Witnesses:
C. A. JENSEN,
Z. JENSEN.